(12) United States Patent
Klein

(10) Patent No.: US 7,120,744 B2
(45) Date of Patent: *Oct. 10, 2006

(54) SYSTEM AND METHOD FOR MANAGING A CACHE MEMORY

(75) Inventor: Dean A. Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 322 days.

This patent is subject to a terminal disclaimer.

(21) Appl. No.: 10/724,472

(22) Filed: Nov. 26, 2003

(65) Prior Publication Data

US 2004/0111588 A1 Jun. 10, 2004

Related U.S. Application Data

(62) Division of application No. 09/178,196, filed on Oct. 23, 1998, now Pat. No. 6,658,552.

(51) Int. Cl.
*G06F 12/00* (2006.01)
*G06F 9/30* (2006.01)

(52) U.S. Cl. .................... 711/118; 711/109; 711/165; 712/208

(58) Field of Classification Search ............... None
See application file for complete search history.

(56) References Cited

U.S. PATENT DOCUMENTS

| | | |
|---|---|---|
| 3,593,304 A | 7/1971 | Gardner et al. |
| 3,787,817 A | 1/1974 | Goldberg |
| 3,820,079 A | 6/1974 | Bergh et al. |
| 4,068,305 A | 1/1978 | Cutler |
| 4,096,566 A | 6/1978 | Borie et al. |
| 4,631,660 A | 12/1986 | Woffinden et al. |
| 4,731,737 A | 3/1988 | Witt et al. |
| 4,760,523 A | 7/1988 | Yu et al. |
| 4,860,192 A | 8/1989 | Sachs et al. |
| 4,876,643 A | 10/1989 | McNeill et al. |
| 4,896,133 A | 1/1990 | Methvin et al. |
| 4,907,189 A | 3/1990 | Branson et al. |
| 4,920,483 A * | 4/1990 | Pogue et al. ............ 711/219 |
| 5,060,143 A | 10/1991 | Lee |
| 5,131,085 A | 7/1992 | Eikill et al. |
| 5,134,711 A | 7/1992 | Asthana et al. |
| 5,163,142 A | 11/1992 | Mageau |
| 5,179,711 A | 1/1993 | Vreeland |
| 5,197,135 A | 3/1993 | Eickemeyer et al. |
| 5,222,225 A * | 6/1993 | Groves .................... 710/22 |
| 5,226,165 A | 7/1993 | Martin |
| 5,353,424 A | 10/1994 | Partovi et al. |

(Continued)

OTHER PUBLICATIONS

TMS320C80 (MVP) Transfer Controller User's Guide, Chapters 1-4, pp. TC:1-1 through 4-54, Copyright © 1995, Texas Instruments Incorporated.

*Primary Examiner*—Reginald G. Bragdon
*Assistant Examiner*—Shawn Gu
(74) *Attorney, Agent, or Firm*—Knobbe, Martens, Olson & Bear, LLP

(57) ABSTRACT

A processing system optimized for data string manipulations includes data string execution circuitry associated with a bus interface unit or memory controller. Cache coherency is maintained, and data move and compare operations may be performed efficiently on cached data. A barrel shifter for realignment of cached data during move operations and comparators for comparing a test data string to cached data a cache line at a time may be provided.

46 Claims, 7 Drawing Sheets

U.S. PATENT DOCUMENTS

| | | |
|---|---|---|
| 5,355,460 A | 10/1994 | Eickemeyer et al. |
| 5,404,473 A * | 4/1995 | Papworth et al. ............ 712/241 |
| 5,418,529 A | 5/1995 | De Luigi et al. |
| 5,442,802 A | 8/1995 | Brent et al. |
| 5,519,873 A | 5/1996 | Butter et al. |
| 5,590,370 A | 12/1996 | Asthaná et al. |
| 5,675,765 A | 10/1997 | Malamy et al. |
| 5,710,905 A | 1/1998 | Wan |
| 5,752,015 A * | 5/1998 | Henry et al. ................. 712/241 |
| 5,752,071 A | 5/1998 | Tubbs et al. |
| 5,754,878 A | 5/1998 | Asghar et al. |
| 5,760,780 A | 6/1998 | Larson et al. |
| 5,764,946 A | 6/1998 | Tran et al. |
| 5,802,556 A * | 9/1998 | Patel et al. .................. 711/109 |
| 5,887,137 A | 3/1999 | Kadoya |
| 5,900,012 A * | 5/1999 | Tran ........................... 711/120 |
| 5,943,681 A * | 8/1999 | Ooishi ........................ 711/105 |
| 6,085,291 A | 7/2000 | Hicks et al. |
| 6,658,552 B1 | 12/2003 | Klein |
| 6,711,667 B1 | 3/2004 | Ireton |

* cited by examiner

SYSTEM AND METHOD FOR MANAGING A CACHE MEMORY

REFERENCE TO RELATED APPLICATION

The present application is a divisional of, and claims priority benefit under 35 U.S.C. § 120 from, U.S. application Ser. No. 09/178,196 filed Oct. 23, 1998, entitled "PROCESSING SYSTEM WITH SEPARATE GENERAL PURPOSE EXECUTION UNIT AND DATA STRING MANIPULATION UNIT," now U.S. Pat. No. 6,658,552 issued Dec. 2. 2003, which is incorporated herein by reference.

BACKGROUND OF THE INVENTION

1. Field of the Invention

The invention relates to digital data processing circuits. In particular, the invention relates to the performance of data manipulation functions performed on strings of data elements.

2. Description of the Related Art

Conventional microprocessing circuits include several common building blocks. Essentially all such systems include a main memory storage area for storing data and instructions, and an execution unit for operating on the data in accordance with the instructions. After the function specified by a given instruction is performed, processed data is returned to the main memory storage area.

Increases in processor performance have been obtained by enhancements to this fundamental scheme. The processor may include two or more separate execution units which can process multiple instructions in parallel. The Intel Pentium and Pentium Pro are two examples of this type of processor. In some cases, different execution units are dedicated to different functions. The Intel Pentium Pro, for example, includes separate execution units for floating point and fixed point arithmetic operations. Another performance enhancement in almost universal use is the provision of data and instruction caches which provide local storage of recently used data and instructions. This speeds the fetching and storing of data and instructions by reducing the number of memory accesses required from a typically much slower main memory storage area.

Still, some types of operations are performed inefficiently by these processor architectures. One inefficiently performed class of instructions is data string manipulation instructions. In these instructions, operations involving a sequence of data elements are performed. For instance, a block of data may be moved from one series of memory addresses to another series of memory addresses. Alternatively, the elements of a block of data may be compared to a test data element or a string of test data elements. In the Intel Pentium Pro, assembly language instructions are provided to perform these functions on a specified string of data. Although the total length of the processed string can be very large, data is moved and/or analyzed as short string portions of at most 32 bits long due to the bus width and 32 bit execution unit. Performing a string move on the Pentium Pro thus involves a sequential process of reading and writing pieces of the data string to and from main memory (or to and from the cache for those portions of the string which are present there). String scans for matching data are similarly performed. Short pieces of the string are read from memory and compared to the desired test string. Thus, the Pentium Pro architecture includes useful string instructions as part of its instruction set, but is incapable of performing string operations on large strings as quickly as memory technology might allow.

Another commercially available device which includes string manipulation features is the TMS320C80 digital signal processor from Texas Instruments. Because this device is adapted for use in video and multimedia applications, features for improving the speed of movement of large blocks of data such as a set of image pixels are included. In the TMS320C80, the programmer may write string movement parameters to a memory location. These string movement parameters can then be transferred to the memory controller portion of the device, and the string movement is performed by the memory controller without further involvement of the execution unit. This feature helps speed up the movement of data blocks, but setting up the transfer parameters requires preliminary write operations, which is inconvenient for the programmer, and results in the need to use several instructions to initiate a block move. Furthermore, although the TMS320C80 includes a data cache, these memory move operations are not performed utilizing cached data, and no mechanism to ensure cache coherency with the main memory where the data move occurs is provided.

Other implementations of memory systems which can perform data manipulation have been described. In U.S. Pat. No. 5,590,370, a system is disclosed which includes "active memory elements" that incorporate processing logic for performing searches and other data manipulations outside of the host processing circuit. U.S. Pat. No. 4,731,737 also discusses memory elements which can receive data manipulation commands from an external host processor. However, neither of these systems provide for cache coherency, and they further do not describe the use of assembly language instruction sets which provide simple and efficient programming of data string manipulations. Thus, there is a continuing need for improvements in processor architectures to allow the processing of data strings quickly and efficiently.

SUMMARY OF THE INVENTION

A digital processing system optimized for string manipulations comprises an instruction fetch unit coupled to an external memory, a first execution unit coupled to receive, decode, and perform assembly language arithmetic and logic instructions received from external memory via the instruction fetch unit, and a second execution unit coupled to receive, decode, and perform assembly language string manipulation instructions received from external memory via the instruction fetch unit. Instructions may be analyzed to detect data string operations for routing to the appropriate execution unit.

In systems with data caching, data may be reassigned from a first memory location to a second memory location by writing a value to an entry in a cache tag memory without changing the content of an entry in a cache data memory associated with the entry in the cache tag memory. In some embodiments, data move operations include reading a cache line containing at least a portion of data from a data cache; shifting the cache line a selected amount, and storing the cache line in the data cache.

Compare operations in systems with data caching are also optimized. Accordingly, a cache memory system may comprise a data memory configured to hold cache lines comprising a plurality of bytes of data and a plurality of comparators, wherein each comparator has a first input coupled to the data memory such that each comparator receives one of the plurality of bytes of data via its associated first input, and wherein each comparator has a second input coupled to a second data source, whereby the cache line may be compared to data received from the second data source. The second data source may comprise external string manipulation circuitry.

DETAILED DESCRIPTION OF THE INVENTION

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention.

Figure 1:
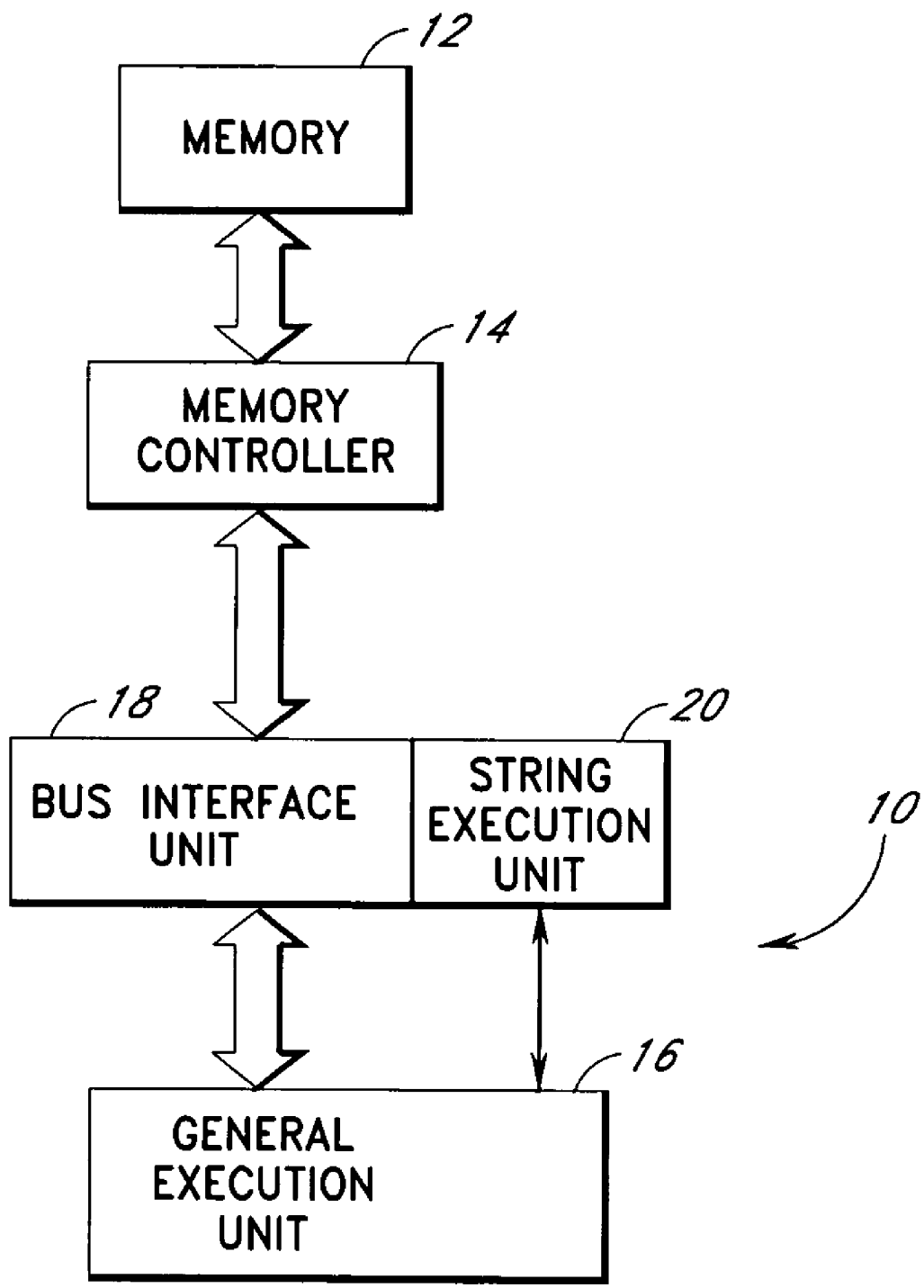
FIG. 1 is a block diagram of a processor circuit according to one embodiment of the invention.

Referring now to FIG. 1, a processing system according to one embodiment of the invention is illustrated. The processing system of FIG. 1 includes a central processing unit (CPU) 10, which is coupled to a main memory 12 through a memory controller 14. Main memory 12 typically comprises dynamic random access memory (DRAM) circuits. These memory devices send and receive data elements to and from the memory controller 14 in response to control signals which include row and column addresses specifying desired data elements. As used herein, a data element corresponds to the data associated with a single address in the address space supported by the processing system. Depending on the processing system, a data element may be a single bit, an 8 bit byte, or may be 64 or more bits long. In the Pentium architecture referred to throughout this specification, a data element is an 8 bit byte.

Different control signal formats may be used with different types of memory devices 12. Some types of DRAM circuits are adapted to efficiently store and retrieve strings of data from consecutive addresses. Page mode DRAMs, for instance, will output a sequence of data elements having a common row address without needing to re-receive the same row address with each DRAM access. Synchronous DRAM (SDRAM) memories are clocked devices which include a mode register which is loaded with an access burst length definition. In these devices, all accesses are burst mode. Consecutive data elements are placed on the data output pins in each clock cycle in response to a single presented starting address and the burst length definition. The memory controller 14 used in the processing system of FIG. 1 will be configured to interface appropriately to whatever type of memory device 12 is being utilized.

It is one aspect of many prior art processing systems that string manipulation instructions are performed without fully exploiting the burst data access capabilities of certain DRAM devices. As mentioned above, string instructions are often performed on small segments of the string at a time. This requires alternating between reading and writing the string data elements, thereby preventing the possibility of taking advantage of long burst reads and writes whereby the same total number of read and write operations can be performed more quickly. Thus, as will be seen more fully below, the invention has advantageous application to processing systems which incorporate a main memory 12 which supports burst mode data accesses such as an SDRAM device.

The CPU 10 includes a first execution unit 16 for performing instructions. It will be appreciated that the execution unit 16 will generally include several components, including an instruction register, an instruction decoder, one or more ALUs, as well as possibly data and instruction caches. The execution unit 16 receives data and instructions from a bus interface unit 18 which communicates with the memory controller 14. In operation, instructions and data are received by the execution unit 16, the data is processed in accordance with the instructions, and the processed data is returned to the memory 12.

Figure 2:
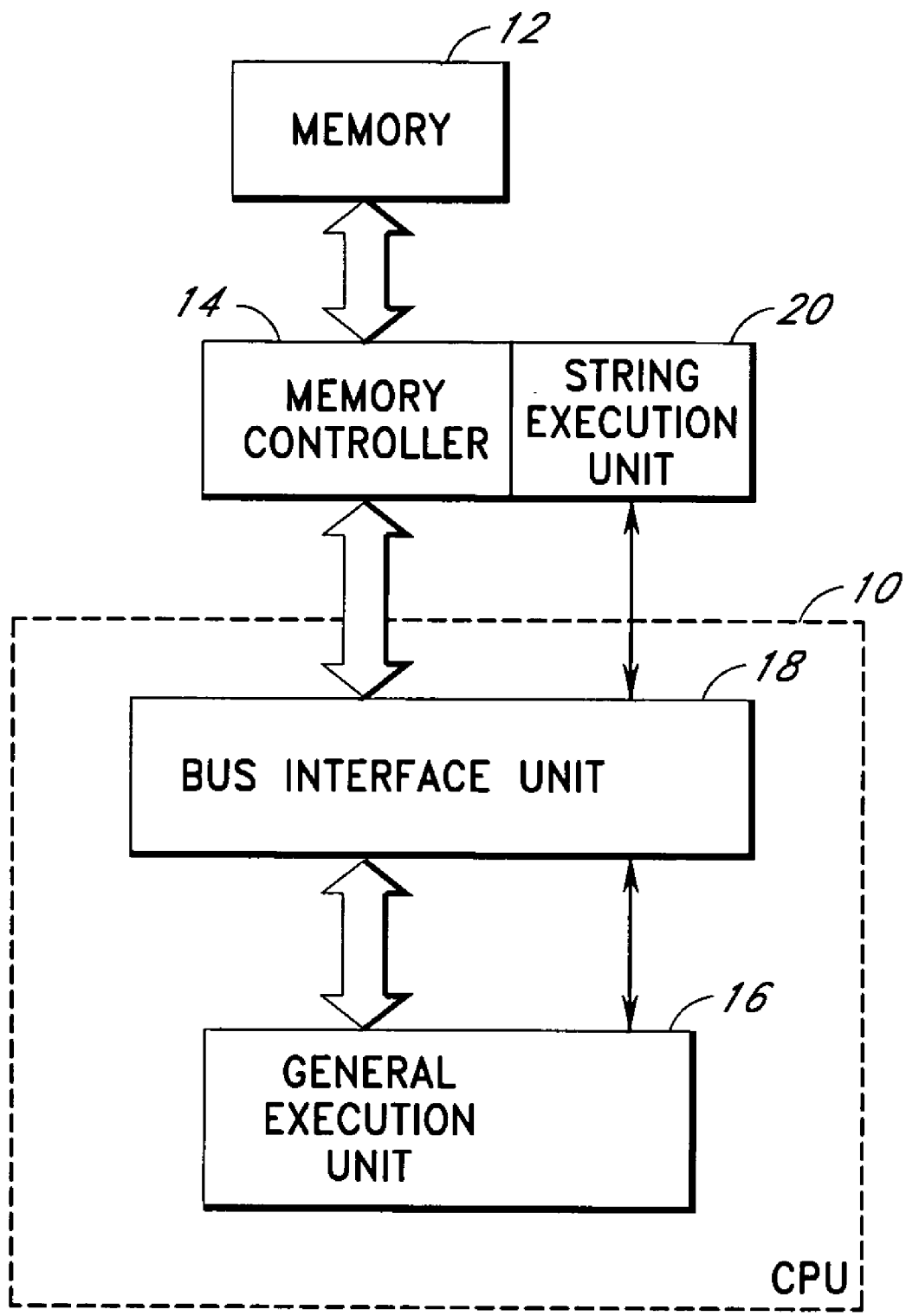
FIG. 2 is a block diagram of a processor circuit according to a second embodiment of the invention.

In one embodiment of the invention, not all of the instructions received by the first execution unit 16 are performed under its control. In this embodiment, string manipulation instructions received by the execution unit 16 are forwarded to a second execution unit 20 separate from the first execution unit 16. As string manipulations involve heavy memory access traffic, it is advantageous to associate this second execution unit 20 with either or both of the memory controller 14 or the bus interface unit 18, as these two units may be directly involved with controlling memory accesses. FIG. 1 illustrates an embodiment wherein string instruction execution circuitry 20 is associated with the bus interface unit 18. FIG. 2 illustrates an embodiment wherein string instruction execution circuitry 20 is associated with the memory controller 14.

It will be appreciated that the location of string execution circuitry may vary depending on the design and location of main memory 12, cache memories (not shown in FIGS. 1 and 2), and the memory controller circuitry 14. Systems without data cache capabilities and an off chip main memory and memory controller may include essentially all of the string manipulation execution circuitry on the off chip memory controller. In Pentium processor based architectures, commonly implemented hardware configurations include a data cache on the processor integrated circuit accessed by the bus interface unit, and a second data cache and main DRAM memory external to the processor. The second data cache and main DRAM memory are accessed by an external memory control and bus bridge chipset which provides an interface between the processor and the second off chip data cache and the main memory. The Pentium Pro architecture incorporates the second data cache onto a single module with the processor integrated circuit such that both the first and second data caches are controlled by the bus interface unit on the processor integrated circuit. In these typical Pentium and Pentium Pro configurations, string execution circuitry may be provided both on the processor integrated circuit in association with the bus interface unit and on the off chip memory controller integrated circuit. In this way, string manipulations may be efficiently performed on cached and uncached data. As a final example, the TMS320C80 processor described above includes a data cache and a portion of main memory on the processor integrated circuit. The on chip bus interface unit of this device also includes integral DRAM memory control circuitry for interfacing to off chip main memory without an intervening memory controller integrated circuit. In this type of architecture, the string execution circuitry will advantageously be entirely located on the processor integrated circuit in association with the bus interface unit.

It will be appreciated that the principles of the invention are applicable to any variety of circuit element placement and distribution of memory and memory control devices. In any of these applications, manipulations of strings of data may be performed by circuitry associated with memory control. This circuitry will be configured to interface with the memory technology being used by the processing system, and can take advantage of the block read and write features of different DRAM memory devices when performing string manipulation instructions.

Figure 3:
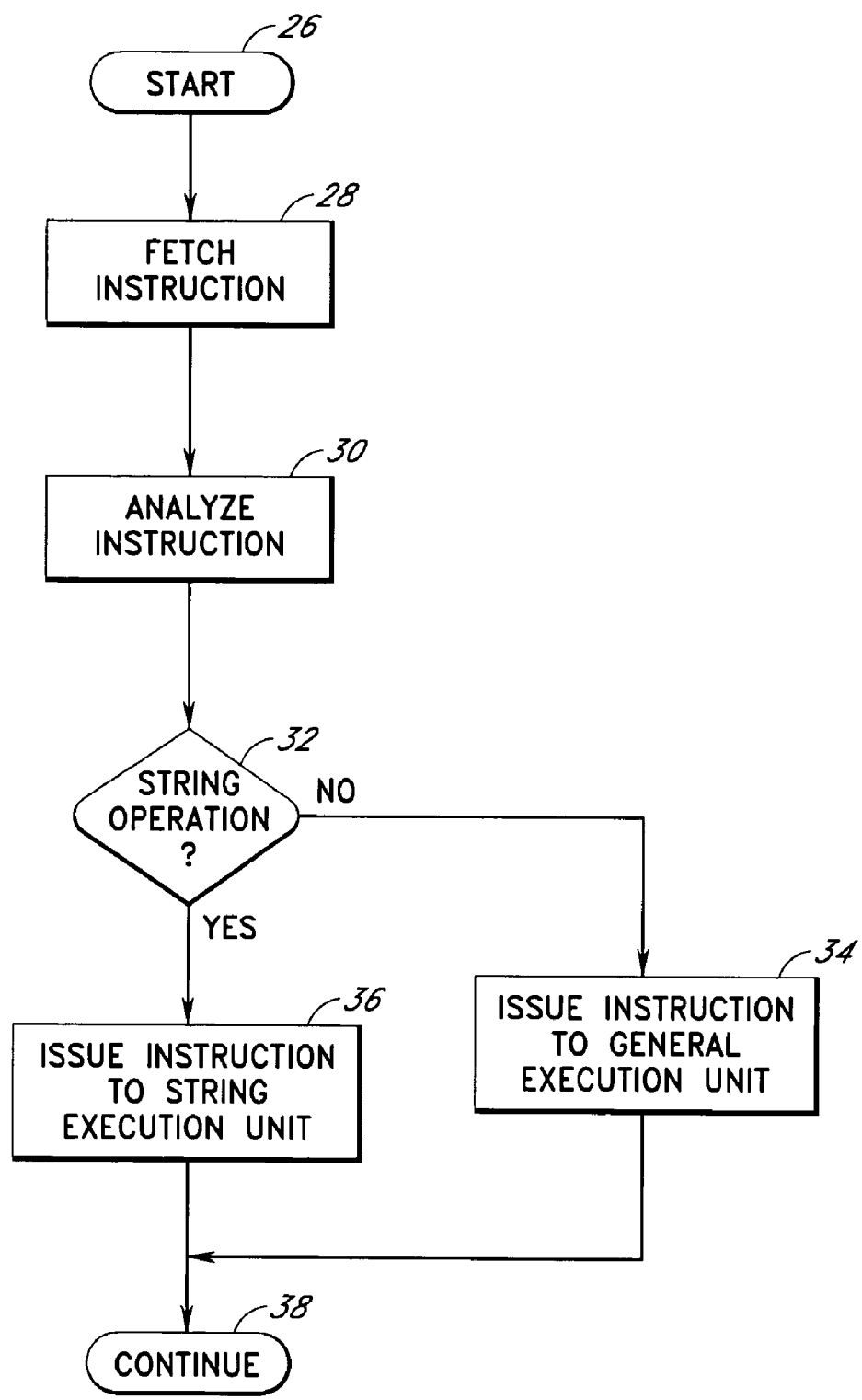
FIG. 3 is a flow chart illustrating a data string manipulation performed in a processing circuit according to one embodiment of the invention.

FIG. 3 illustrates a procedure which may be performed by the system architectures illustrated in FIGS. 1 and 2. The process begins at start block 26 and proceeds to block 28 where an instruction is fetched from memory. Depending on the data storage format of the system, this fetching may be from main memory or an instruction cache. After being fetched, the instruction is analyzed at block 30 in order to determine at decision block 32 whether or not the instruction calls for a data string manipulation. If the instruction does not call for a string manipulation, at block 34 the instruction is issued to the general execution unit which services non-string arithmetic, logical, or other data processing operations. If the instruction does call for a data string manipulation, at block 36 it is sent to the string execution circuitry for processing. Following instruction issuance, the sequence continues at block 38. Thus, assembly language instructions for data string operations are recognized and issued to a dedicated processing unit for processing in a manner which is optimized for the memory technology utilized in the processing system.

Figure 4:
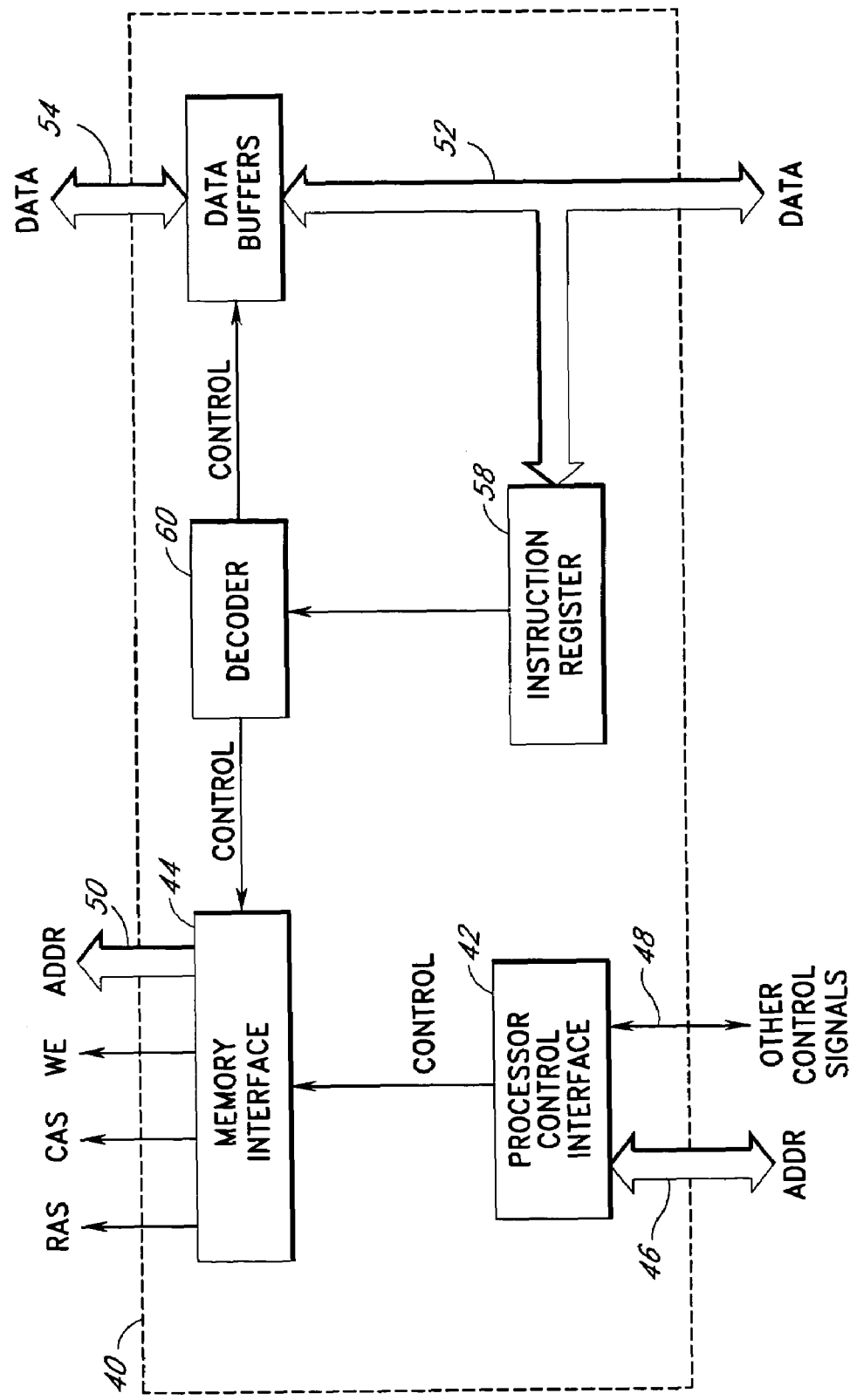
FIG. 4 is a block diagram of a memory controller circuit for receiving and performing data string manipulation instructions.

Referring now to FIG. 4, a memory controller 40 incorporating string execution circuitry is illustrated. In the embodiment of FIG. 4, the memory controller 40 resides on a separate integrated circuit from the processor. As in conventional memory controller integrated circuits, host processor control interface circuitry 42 and DRAM memory control interface circuitry 44 is provided. The host control interface 42 includes an address bus 46 and several other control signals 48 which initiate and define bus cycles and otherwise control data transfer between the host processor and the memory controller. The memory interface 44 also includes an address bus 50, and standard DRAM memory control signals such as row and column address strobes. In systems with a data cache separate from the processor integrated circuit, the memory controller 40 may additionally include an SRAM interface (not shown in FIG. 4) for retrieval and forwarding of cached data to the host processor. The memory controller 40 also includes a data bus 52 coupled to the host processor, and a second data bus 54 coupled to the memory devices. A set of data buffers 56 temporarily store data as it passes through the memory controller circuit.

In accordance with one embodiment of the invention, the memory controller circuit 40 further includes an instruction register 58 and an instruction decoder 60. The instruction register 58 may be configured to receive string instructions from the host processor and to forward those string instructions to the instruction decoder 60. The instruction register 58 may be configured as a multi-instruction buffer so that a series of data string instructions can be queued in the memory controller 40. The decoder 60 controls the memory interface 50 and data buffers 56 to perform data string manipulations such as string moves without further involvement of the host processor. During a string move operation, for example, the decoder 60 may control the memory interface so as to load a source string into a data buffer among the data buffer set 56, and then write this source data back to the main memory at its destination addresses.

It will be appreciated that although FIG. 4 illustrates a memory controller on a separate integrated circuit from the host processor, some or all of the circuitry shown in FIG. 4 may be incorporated onto the same integrated circuit as the processor, or may be split among several additional integrated circuits. For example, the memory control interface 44 could be incorporated into a processor bus interface unit, and is so incorporated in some commercially available signal processors. As another alternative, some commercially available memory controller and bridge chip sets place the data buffers 56 on a separate integrated circuit from the memory interface 44. The invention has application to all of these alternative designs.

Methods of issuing instructions to particular execution units dedicated to particular tasks are well known, and a wide variety of techniques may be used. Instruction dispatching to multiple execution units is performed in many commercially available microprocessors and digital signal processors, including the Pentium and Pentium Pro. If the string execution circuitry is on the same integrated circuit as the other execution units of the processor, multiple busses connecting an instruction dispatch unit to the various execution units, including the string execution unit, may be used for proper string instruction routing.

Sending string instructions to an off chip memory controller may also be accomplished in a variety of ways. It would be possible, for example, to include a dedicated set of signal lines between the host processor and the off-chip memory controller for passing string manipulation instructions. In other embodiments, however, string instructions may be passed in ways which do not require modification of the currently used physical interfaces between host processors and off chip bridge and memory controller circuits.

In conventional memory controllers, the host processor uses several of the control signals 48 to initiate and define bus cycles for performing different types of data transfer operations. Memory read, memory write, I/O read, and I/O write are four bus cycle examples. When the host processor asserts a selected set of control signal lines, the memory controller becomes configured to communicate with the processor according to the requested operation. This type of interface protocol is currently used to transfer setup information from the host processor to internal configuration registers in memory controllers, and can also be used in an analogous manner to transfer string instructions to an instruction register 58 internal to the memory controller. One convenient method of accomplishing this would be to use an I/O write bus cycle to transfer data to an I/O address that is mapped to the instruction register 58. In this case, information from the processor which comprises the string manipulation opcode and its associated parameters is loaded from the data bus 52 into the instruction register 58 in response to an I/O write command directed to that address.

An I/O write bus cycle may also be directed to an address not normally used for I/O devices. In the Intel Pentium architecture, I/O operations are limited to the bottom 64 k of address space. In this embodiment, a memory controller in accordance with the invention may receive a command to perform an I/O write bus cycle, but receive a write address which is set to a unique pre-defined configuration defining an address outside the normal 64 k I/O address space. If this occurs, the memory controller can be configured to recognize this as a command to accept a string manipulation op-code and its associated parameters from the host data bus 52, and the memory controller will load information which follows from the processor into the instruction register 58.

Based on the foregoing description, it can be appreciated that the most advantageous application of the above described principles will vary with various processor architectures. The presence and location of data caches, the types of string manipulation instructions supported in the processor instruction set, the degree of incorporation of memory control circuitry on the processor integrated circuit, and other factors will influence the optimal functionality and location of dedicated string manipulation circuitry.

Figure 5:
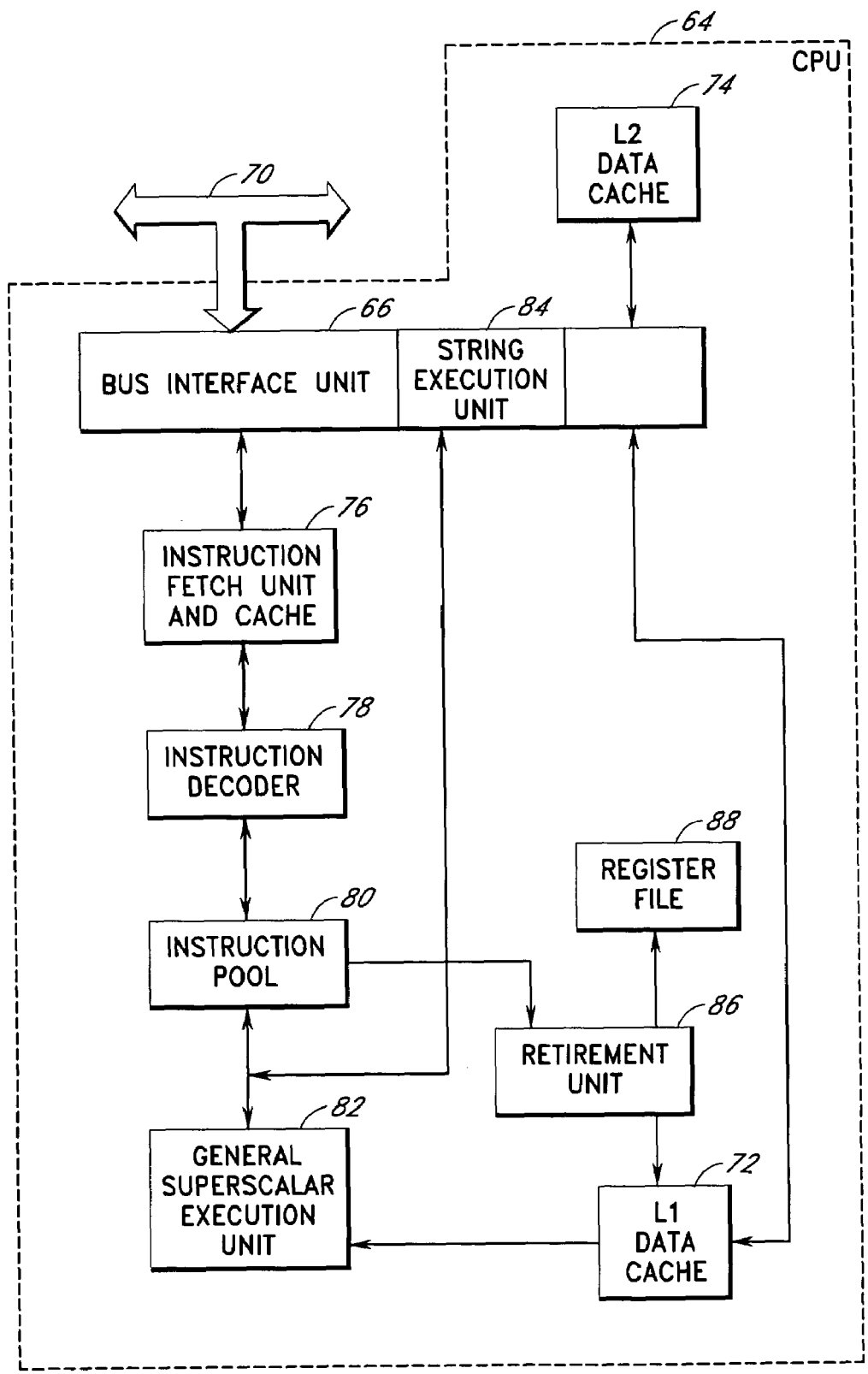
FIG. 5 is a block diagram of a processor circuit according to one embodiment of the present invention including first and second data caches.

Accordingly, and referring now to FIG. 5, an example implementation of string manipulation optimization according to the invention is provided. For this example, a processor architecture based on the Intel Pentium Pro design is used for illustration. The processor 64 of FIG. 5 includes a bus interface unit 66 which provides communication with off chip main memory via external address, data, and control busses 70. As will be also discussed in more detail below, these busses 70 may couple to a memory controller like that illustrated in FIG. 4. The bus interface unit 66 also communicates with a Level 1 data cache 72 and a Level 2 data cache 74. In the Pentium Pro, for example, the Level 1 cache is a 8 kB cache on the same die as the processor, and the Level 2 cache is a 256 kB cache located in the processor module but on a separate die.

Instructions are fetched and cached from external memory by an instruction fetch unit 76, and are forwarded to an instruction decoder 78 which decodes each assembly language instruction and converts it into two or more simple micro-operations. The micro-operations are routed into an instruction pool 80 where they await dispatch to an appropriate execution unit. After execution by an execution unit 82, micro-operations are retired by a retirement unit 86, and the processor state is updated by writing results to memory or to an on-board register file 88. The processor design illustrated in FIG. 5 can be made to support branch prediction, as well as out of order and speculative instruction execution. All of these features will affect the optimal methods of issuance and execution of string instructions.

In a conventional processor architectures of this type, such as in the Pentium Pro design, string manipulation instructions are treated the same as arithmetic and logical instructions. String moves, for example, are treated as sequences of individual data move operations. A command MOVSB (part of the Pentium Pro instruction set) is an example of an individual data move operation. This command moves a byte of data from a source address to a destination address. The source and destination addresses are loaded in source and destination address registers in the register file 88. In the Pentium Pro, these registers are referred to as the SI and DI registers. The MOVSB command also has the automatic effect of incrementing the addresses stored in the SI and DI registers by one. These registers may alternatively be decremented by one, depending on the status of a flag also located in the register file 88. Individual data move commands of word and doubleword size are also provided, and in these cases, the SI and DI registers are incremented or decremented by 2 or 4 respectively.

Although a string move may be programmed using an individual data move operation in a loop, it can be advantageous to include string manipulation instructions in the assembly language instruction set. This is done in the Pentium Pro by allowing the programmer to include a REP prefix in front of the data move instruction. The command REP MOVS, for example, repeats an individual byte, word, or doubleword move until a count register in the register file 88 becomes zero. During the string move operation, the SI and DI registers are appropriately incremented or decremented with each individual data move, and the count register is also decremented. This continues until the count register reaches zero, at which point the move operation terminates. Thus, in conventional systems, string move operations are converted into long sequences of individual load, store, and branch micro-operations by the instruction decoder 78. These micro-operations are executed by the general execution unit 82 one at a time.

In contrast, in an embodiment of the invention shown in FIG. 5, a string manipulation instruction is not converted into a sequence of micro-operations by the decoder 78. Instead, the string manipulation instructions may be directly forwarded essentially undecoded to the instruction pool 80. In the instruction pool 80, the instructions are analyzed to recognize string manipulation opcodes. When one is detected, this instruction is issued to the string execution circuitry 84 in the bus interface unit 66. The bus interface unit 66 may in turn forward the string manipulation instruction to an external memory controller having string execution circuitry, if the manipulation is to be performed in off chip main memory.

As mentioned above, the instructions in the instruction pool 80 may be executed out of the original program order, and may be executed speculatively as part of a predicted branch which has not yet been taken. In this type of architecture, instruction analysis circuitry associated with the instruction pool 80 must monitor data dependencies among instructions. For the string manipulation instructions, issuance to the bus interface unit 66 will generally await the completion of any instruction which modifies data in source or destination address blocks. Subsequent instructions which overwrite source data or read from destination data should also await completion of the string manipulation instruction prior to being executed. String manipulation instructions such as a string move involving write operations should not be executed speculatively as part of a predicted branch, as there is no way to transparently undo the write if the predicted branch is not taken. Although the instruction analysis circuitry associated with the instruction pool 80 may need to be more complex than in conventional processors due to the need to evaluate data dependencies regarding blocks of addresses, implementation would be a straightforward enhancement to logic currently provided in conventional microprocessors.

A string move instruction in the present architecture may thus be executed as follows, ignoring, for the moment, the possibility that source and/or destination data is cached on the processor chip. The format for the instruction will include a string move opcode, as well as the starting source address, the starting destination address, the size of the data elements to be moved (i.e. byte, word, doubleword, etc.) and a count indicating the number of data elements to be moved.

It may be noted that conventional register architectures associated with individual data move operations need not be altered even if the string move operation is performed off-chip. At the time the instruction op-code and parameters are issued to the bus interface unit 66, the starting source and destination addresses can be appropriately incremented or decremented in a single cycle by the amount indicated by the value of the count parameter. Circuitry to perform this function may be present in the bus interface unit 66. These new values can be immediately loaded into the SI and DI registers in the register file 88 without going through the conventional sequential incrementing or decrementing as the string move operation proceeds. The count register can simply be cleared. The processor now has its on board SI, DI and count registers in the same state they would be in had the string move been accomplished in a conventional manner. The string move opcode and parameters can be routed off-chip, and the string move may proceed without further processor involvement.

Normally, the processor operates on virtual addresses, and the memory controller and main memory operate with physical addresses. Address translation takes place in the processor prior to issuing memory access requests to external memory. Either the same virtual to physical address translation must be performed by the processor prior to sending string move parameters off-chip, or the processor must provide address translation information to the memory controller to allow it to perform the required translations. Either method may be used. Address translation is made most convenient if prior to sending a string move instruction off chip, the processor takes string moves which cross page boundaries and breaks them up into independent string move operations, each staying within a virtual page. This function may also be performed by logic associated with the bus interface unit 66.

While the string move operation is being performed off-chip, the processor may be able to execute other instructions in the instruction pool 80 that do not reference source or destination addresses. In a system without caching, later instructions which do reference source or destination memory addresses for stores or loads will be sent to the memory controller, which may be configured to completely service any pending string move operation prior to performing other memory accesses.

The presence of data caches 72, 74 require additional consideration. Coherency must be maintained between cached data and its counterpart in main memory to ensure proper processor operation. In a system configured to send all string move operations to an off chip memory controller, the treatment of cached data will vary with the cache write policies. In a system using a write through policy, all writes to cached addresses are automatically also sent to main memory. In this case, an off chip string move will be certain to be moving the correct data. However, the processor will still be required to invalidate any cache lines containing data from destination addresses.

A write back policy, where cached data is marked modified in the cache, but is not written back to main memory unless required, is a more common cache write policy. In this case, any modified cache lines involved in the string move will need to be written back to main memory. This may be done prior to initiating the string move off chip. Alternatively, the string move operation may be treated by the memory controller in a manner analogous to a non-processor memory access from, for example, a PCI bus master. Conventional memory controllers are already configured to perform snoop cycles, wherein a memory address being accessed by some other device is sent to the processor, which checks to see if the data being accessed exists in a modified state in a data cache. If a snoop hit occurs, the data in the cache is written back to main memory before the other device accesses that memory location. The same procedure may be performed by the memory controller when it is processing a string move operation. As the operation progresses, source addresses could be periodically sampled by the processor to detect the presence of modified cached data which is to be moved. A snoop hit results in a cache line write back prior to continuing the string move operation. This will not necessarily slow the operation significantly, as each snoop cycle analyzes an entire cache line. It will be appreciated that in this case as well cache lines containing destination addresses need to be invalidated.

For off chip string manipulation in the processor architecture illustrated in FIG. 5, it will therefore be advantageous to include string instruction execution circuitry both in the bus interface unit and in the off chip memory controller. This is true even if the actual data movement is performed only off chip. The circuitry on the off chip memory controller may be utilized to perform the actual data manipulation, while the on-chip string instruction circuitry may be used to update registers in the register file 88, and control any required pre-execution cache line write backs.

When the source string is entirely present in a data cache on the processor, it would be optimal to perform the string manipulation in the cache memory without performing the string instruction in the external memory. One advantageous method of performing a string move quickly on cached data is to utilize virtual data movement by simply writing new cache tag values into the cache tag memory to indicate the destination addresses. When this can be done, no time consuming data reads and writes need to be performed.

The principles of this process may be illustrated most clearly using a simple example of a fully associative cache memory having a one byte cache line size. In this example, a cache tag memory stores the main memory address of each byte in the cache. Because the cache is fully associative, a byte from any main memory address may be stored in any one of the locations in the cache. In a system implementing a write back cache policy, moving a byte of data which is present in the cache may be accomplished by simply overwriting the source address stored in the tag memory location associated with the byte with the appropriate destination address, and marking the line modified. To move an entire string of bytes, each tag memory location corresponding to each byte of the string may be updated with the appropriate destination address, and the lines may again be marked modified.

Figure 6:
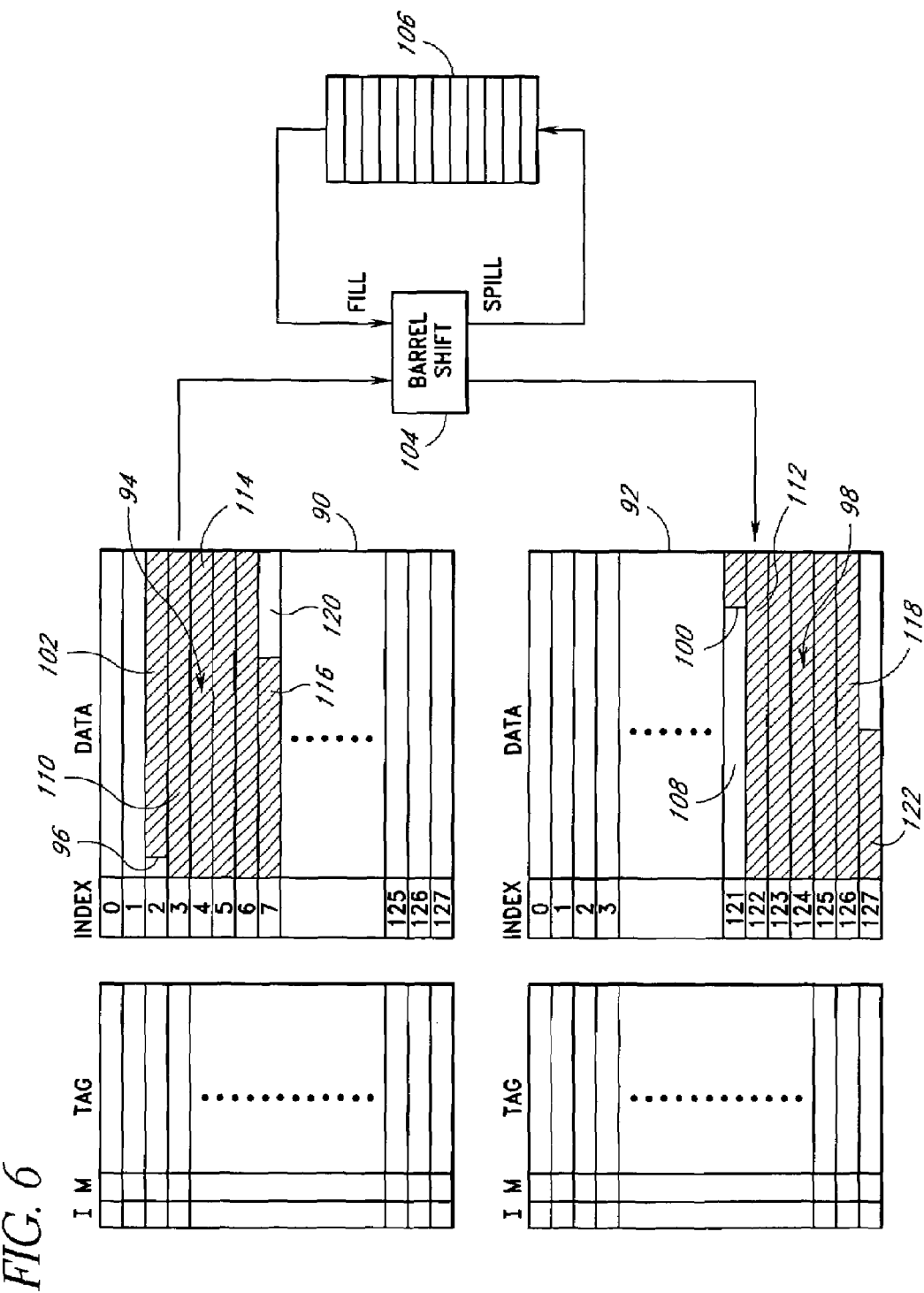
FIG. 6 is a block diagram of a two-way set associative data cache including string move circuitry for fast string move operations.

Most processing systems use set associative rather than fully associative caches, and have cache line sizes longer than one byte. Implementing such virtual data movement in these environments involves additional considerations which are illustrated in FIG. 6. This Figure illustrates an 8 kB, two-way set associative cache with a 32 byte cache line. This corresponds to the configuration of the L1 cache in the Pentium Pro processor. In one embodiment, the main memory address comprises 32 bits. Of these 32 bits, the 20 most significant comprise the tag, and the next 7 bits may be termed the index. The 5 least significant bits are an offset, and define a specific byte within a 32 byte cache line. The data memory portions 90, 92 of the cache each comprise sets of 128 cache lines. With a two-way set associative cache as illustrated in FIG. 6, there is one location in each data memory 90, 92 where data from a main memory address having a given index is allowed to reside.

FIG. 6 illustrates how a high speed string move may be performed by altering the location of cached data a cache line at a time, rather than in a conventional manner of a byte, word or doubleword at a time. In general, string moves of cached data may be performed by realigning the moved cache lines to their proper offsets, moving the cached data to a cache memory location identified with the appropriate destination index, and adjusting cache tag values to reflect proper destination address tags. As a specific example, a source string 94 of 178 bytes may begin at an address having a tag of decimal 0, an index of decimal 2, and an offset of decimal 2. The first byte of this string will thus reside at location 96 of FIG. 6. For this example, we may further assume that the starting destination address has a tag of decimal 1, an index of decimal 121, and an offset of decimal 28. The 178 byte source string 94 will therefore be moved to a destination block of addresses 98, beginning at location 100 of FIG. 6. This string move operation is an example of the most general type of string move, as each byte of source data is moved to a destination address having a different tag, index, and offset.

The move operation begins by reading out the 30 source bytes from the first source cache line 102. These bytes are then routed to a byte oriented barrel shifter 104, where they are shifted by an amount equal to the change in offset between the starting source address and starting destination address. In this example, the shift would be 26 bytes. The 26 spill bytes shifted out during this procedure are stored in a register 106. To accommodate all possible changes in offset addresses, this register will have a capacity of one byte less than the cache line size, 31 bytes in this example.

Following the shift, the four bytes which were not spilled to the register 106 are stored in the first destination cache line 108 starting at the first destination address at location 100. If the destination cache line is valid prior to the move, it must be marked modified to indicate the content alteration resulting from the four newly stored bytes of data. If this overwritten destination data is not cached, a line fill of the first destination line could be performed prior to starting the move operation, or the first four bytes moved could be written back to main memory and not cached.

The string move operation then continues by reading out the next source cache line 110. This cache line is also barrel shifted by 26 bytes, with the shift being filled by the 26 bytes stored in the register 106 from the previous shift operation. Once again, the 26 new spill bytes are stored in the register 106. This shifted cache line is then stored in the next destination cache line 112. Because in this step the entire destination cache line 112 has been filled with source data, no concerns about the presence of valid data for a portion of this cache line arise. If the destination data is not present in the cache, the tag associated with this cache line 112 will be updated to reflect the destination tag address (decimal 1 in this example), and the line will be marked modified. If the destination data was cached, the line 112 can simply be marked modified.

The move process continues by reading the next source cache line 114, and performing another 26 byte shift which spills 26 new bytes into the register 106, and is filled with the content of the register 106 from the prior shift operation. At the end of the process, the last cache line 116 is read out. Even though 12 bytes of this cache line comprise data which is not part of the move instruction, the whole cache line 116 may be read out and shifted the same 26 byte shift. The barrel shifted output of this operation will be stored in destination cache line 118. There will now be 26 bytes remaining in the register 106, with the top 12 bytes being non-source data from the last portion 120 of the last source cache line 116. The final step in the move process will be writing the 14 bottom source data bytes from the register 106 into the last destination cache line 122. Because only a portion of the last cache line 122 is modified, it may be treated as described above with respect to the first cache line 108. Either a line fill can be performed prior to writing the remainder of the source data from the register 106 to the line 122, or the remainder of the source data in the register 106 may be written back to main memory and not cached.

It will be appreciated that string moves of long strings may be performed very quickly with this processor design. If the cache read, barrel shift, and cache write are pipelined, the move may proceed at a rate of one cache line per processor cycle. It is also apparent that depending on the source and destination addresses, certain move operations can be performed with very simple operations, often without requiring the barrel shifting step. If the move involves an integral number of cache lines, and the starting source address and destination address have offsets of 0, a move will involve simply a tag update and a set of cache line moves to the appropriate cache index locations. In this 0 offset start and destination situation, even the cache line moves will be avoided in either a fully associative cache, or in a set associative cache where the start and destination indexes of the bytes in the string are the same. In these cases, no cache data reads or writes will need to be performed.

Source overwrite conditions must be considered where the set of source addresses and destination addresses of the move overlap. When the invention is implemented in a system using a direct mapped cache, this problem is most significant, because there will only be one cache memory location to move the source data to, and this destination location may store source data which has not yet been moved. One solution to this problem when using a direct mapped cache would be to detect these source overwrite conditions, and move the string starting with either the first byte of the source data and moving toward the last byte, or starting with the last byte of source data and moving toward the first byte, depending on the direction of the data move. In a fully associative cache design, source overwrites can be avoided by always moving data to cache memory locations away from the cached source block. In set associative caches, source overwrites may be avoided by writing the source data to cache memory locations associated with a different set than the source string is associated with. This is the procedure illustrated in FIG. 6.

Based on the foregoing, it will be understood that many implementation options are available for performing efficient string moves in a processing system with data caches. As discussed above, one option is to perform all moves external to the processor, with appropriate write backs and invalidation occurring before or during the move operation. Alternatively, source strings which are resident in the cache can be handled entirely by updating the cache memory as described above. It may further be desirable to only perform some string moves with the described cache updating methods depending on the source and destination addresses and the length of the string to be moved. Furthermore, a source string of which only a portion is cached may have that portion written back to main memory if in a modified state for an off-chip string move, or the un-cached portion may be cached with appropriate line fills prior to performing the move operation in the cache. It may also be desirable to perform some string moves in a conventional sequential manner, and some in accordance with the methods described herein.

Another string operation which is performed inefficiently in conventional processors is a string search for a specified byte, word, or doubleword. In the Pentium Pro, for example, the REP SCAS instruction will sequentially subtract bytes in memory beginning at a selected start address from a test byte stored in the processor register file 88 (FIG. 5). In response to the result of the subtraction, flags in a status register also in the register file 88 are set or cleared. As with the move operation, the start address, which is specified in the DI register discussed above, is incremented or decremented with each comparison, and the process continues until a matching byte is found. When such a matching byte is found, a zero flag is set, the operations terminate, and the address in the DI register corresponds to the address containing the matching byte.

In accordance with the invention, this process can also be optimized in view of the main memory technology used in the system by performing this string manipulation instruction in a string execution unit associated with the bus interface unit or an off-chip memory controller. As with a string move, block reads of data for comparison may be performed, speeding the data access process for data stored in external main memory. Once a match is found, the DI register or its equivalent could be loaded from the memory controller with the address of the matching data address.

Figure 7:
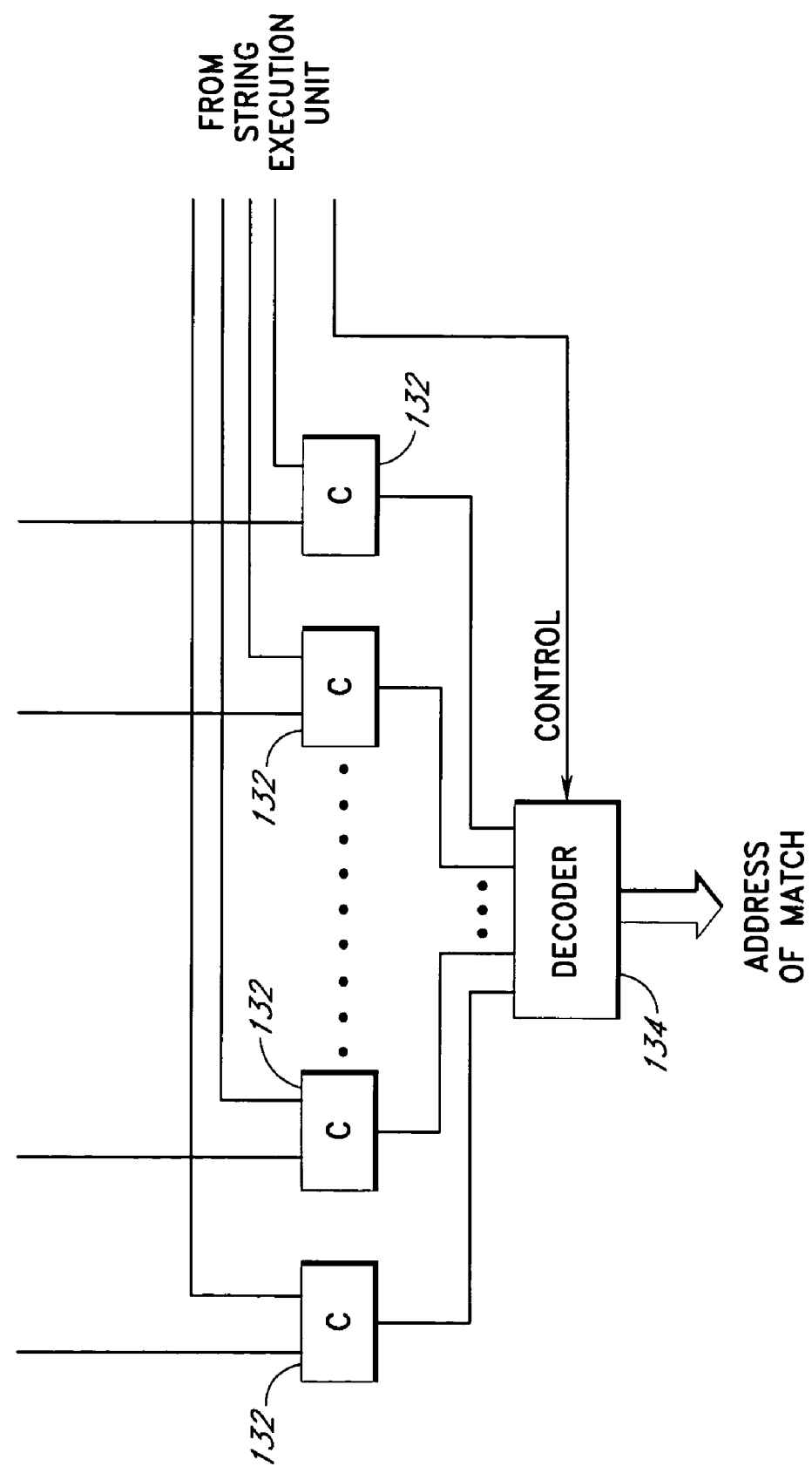
FIG. 7 is a block diagram of data cache circuitry for fast string scan operations.

To facilitate rapid string searches of cached data, the cache memory may be equipped with a set of byte comparators or subtractors. This embodiment of the invention is illustrated in FIG. 7. A set of data comparators 132 are provided which are coupled to the cache data memory. There is one comparator for each byte of the cache line. The comparators each have one input for receiving a designated byte from a cache line, and one input for receiving a test byte from the string execution circuitry. The outputs of the comparators are coupled to a decoder 134 which has as an output the address of the matching byte, if a matching byte is present. With this system, an entire cache line may be compared to a test data string in a single cycle.

If a string scan instruction is sent to an off-chip memory controller, as in some embodiments of the invention, the memory controller may instruct the processor to perform a search of a cache line by performing a bus cycle analogous to a standard snoop cycle. In a conventional snoop cycle, a control signal is asserted by the memory controller initiating the snoop, after which the memory controller presents an address to the processor. The processor then checks the cache tag memory to see if the data at that address is present in a modified line in the cache. A cache hit to a modified line causes the processor to assert a second control signal which is routed to the memory controller.

Similarly, in a string scan request made to the processor, a bus cycle may be initiated which presents a string scan starting address and the comparison data. This operation may be termed a "string snoop". Alternatively, just the starting address may be sent if the comparison data is stored in a temporary register in the processor when the string scan instruction is sent to the external string execution logic. The processor could indicate to the memory controller the presence of a match after performing a byte by byte cache line comparison in a manner similar to a cache hit in a snoop cycle, although advantageously an indication of both the presence of the data and the presence or absence of a match should be indicated to the external circuitry in response to a string snoop bus cycle. The address output of the decoder 134 may be forwarded to the external string execution circuitry when a match is found. This address may then be loaded into the DI register in the processor register file. If more than one match appears in the cache line data being searched, the decoder may be configured to output the address of the matched byte having the lowest address. In this way, the first matching byte of the string will be specified.

Of course, the handling of the string scan instruction will change depending on the length of the test string the source data is to be compared to, as well as the starting address of the source data. For test strings longer than one byte, the comparator outputs may be analyzed in a coupled manner such that the compare data may be of word, doubleword, or quadword size may be used. In these situations, the decoder 134 may be configured to detect a match only when a string of matches of appropriate length is detected. If subtractors rather than comparators are used, the byte subtractors can again be coupled to subtract words or doublewords for example, instead of individual bytes.

If the starting address of the string to be searched is aligned with a cache line boundary, i.e., has a 0 offset, then the compare data can be simply replicated as required for input to the set of comparators 132. For non-aligned strings, the compare data may be aligned to match the offset of the string starting address prior to the compare operation, and replicated as before to provide inputs to all the remaining comparators. Of course, if the test string is only one byte long, no alignment will be required regardless of the offset of the starting address of the string to be searched.

String moves and string scans may therefore be performed with improved efficiency, while retaining cache coherency. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the present invention should not be taken to imply that the terminology is being re-defined herein to be restricted to including any specific characteristics of the features or aspects of the invention with which that terminology is associated. The scope of the present invention should therefore be construed in accordance with the appended Claims and any equivalents thereof.

The invention claimed is:

1. A method for moving a data string within a cache memory system, the method comprising:
reading a cache line from a data cache, the cache line containing at least a portion of a data string and having a starting source address;
shifting the cache line a selected amount in a single processor cycle;
storing the shifted cache line in a first destination cache line in the data cache, the shifted cache line having a starting destination address, and wherein said acts of reading, shifting and storing are pipelined; and
modifying a cache tag value associated with the first destination cache line to reflect a location of the data string in a main memory;
storing in a register data shifted out of the cache line during the shift operation;
reading from the data cache a second cache line containing at least a portion of the data string;
shifting the second cache line said selected amount;
filling the shifted cache line with the data stored in the register during said shifting; and
storing the shifted second cache line in a second destination cache line in the data cache.

2. The method of claim 1, wherein the register has a full storage capacity that is one byte less than the size of the cache line.

3. The method of claim 1, wherein shifting the cache line is performed with a barrel shifter.

4. The method of claim 1, wherein said selected amount is an amount equal to a change in offset between the starting source address and the starting destination address.

5. The method of claim 1, further comprising marking the first destination cache line as having been modified.

6. The method of claim 1, further comprising performing a snoop cycle.

7. The method of claim 1, further comprising writing to the main memory data stored in the first destination cache line prior to the data string move.

8. The method of claim 1, wherein the main memory comprises a DRAM circuit.

9. The method of claim 1, wherein the data cache comprises a Level 1 cache.

10. A cache memory system for moving a data string, the cache memory system comprising:
    a cache memory comprising:
        a cache data memory configured to store a data string; and
        a cache tag memory associated with the cache data memory;
    a shifter coupled to the cache memory, the shifter being configured to shift an entire cache line containing at least a portion of the data string in a single processor cycle, the cache data memory being configured to store the shifted cache line in a destination cache line; and
    a register, coupled to the shifter, for storing all of the data shifted out of the shifter during shift operations, wherein the register has a full storage capacity of less than the size of the entire cache line.

11. The cache memory system of claim 10, wherein the shifter comprises a barrel shifter.

12. The cache memory system of claim 10, wherein the shifter is further configured to shift the entire cache line an amount equal to a change in offset between a starting source address of the cache line and a starting destination address of the shifted cache line.

13. The cache memory system of claim 10, wherein the register is configured to store one byte less than the size of the cache line.

14. The cache memory system of claim 10, further comprising a processor configured to mark the destination cache line as having been modified.

15. The cache memory system of claim 10, further comprising a memory controller configured to perform a snoop cycle.

16. The cache memory system of claim 10, further comprising writing the data stored in the destination cache line to a main memory prior to storing the shifted cache line in the destination cache line.

17. The cache memory system of claim 10, wherein the cache memory comprises a Level 1 cache.

18. A method of reassigning data from a first memory location to a second memory location comprising:
    reading a cache line containing at least a first portion of a data string from a data cache;
    shifting the cache line a selected amount;
    storing the shifted cache line in the data cache;
    storing data shifted out of the cache line during said shifting in a register;
    reading a second cache line containing at least a second portion of the data string from the data cache;
    shifting the second cache line said selected amount;
    filling the second cache line with the data stored in the register during said shifting; and
    storing the second cache line in the data cache.

19. The method of claim 18, wherein a full storage capacity of the register is less than the size of the cache line.

20. The method of claim 18, wherein shifting the cache line is performed with a barrel shifter.

21. The method of claim 18, wherein said selected amount is an amount equal to a change in offset between a source address of the cache line and a destination address of the shifted cache line.

22. The method of claim 18, further comprising marking the shifted cache line as modified.

23. The method of claim 18, further comprising performing a snoop cycle.

24. The method of claim 18, further comprising modifying a cache tag value associated with the shifted cache line.

25. The method of claim 18, further comprising writing a portion of the data string to a main memory without writing the portion to the data cache.

26. The method of claim 25, wherein the main memory comprises a DRAM circuit.

27. The method of claim 18, wherein the data cache comprises a Level 1 cache.

28. The method of claim 18, wherein the acts of reading, shifting and storing are pipelined.

29. A cache memory comprising:
    a data memory;
    a barrel shifter coupled to the data memory, the barrel shifter being configured to shift an entire cache line of the data memory in a single processor cycle; and
    a register coupled to the barrel shifter for storing all of the data shifted out of the barrel shifter during shift operations, wherein the register has a full storage capacity that is less than the size of the cache line.

30. The cache memory of claim 29, wherein the barrel shifter is further configured to shift the entire cache line an amount equal to the change in offset between a source address and a destination address of the cache line.

31. The cache memory of claim 29, further comprising a processor configured to mark the cache line as having been modified.

32. The cache memory of claim 29, further comprising a memory controller configured to perform a snoop cycle.

33. The cache memory of claim 29, wherein the data memory comprises a Level 1 cache.

34. The cache memory of claim 29, wherein at least a portion of the data is written to a main memory instead of to the data memory.

35. The cache memory of claim 34, wherein the main memory comprises a DRAM circuit.

36. A processor comprising:
    a cache memory;
    means for reading a cache line from the cache memory;
    means for shifting the cache line a selected amount in a single processor cycle;
    means for storing all of the data shifted out of the cache line during the said shifting, wherein said means for storing data has a full storage capacity that is less than the size of the cache line; and
    write circuitry for writing the shifted cache line to the cache memory.

37. The processor of claim 36, wherein the means for shifting comprises a barrel shifter.

38. The processor of claim 36, wherein said selected amount is an amount equal to the difference in offset between a source address of the cache line and a destination address of the shifted cache line.

39. The processor of claim 36, wherein the means for storing data shifted out of the cache line comprises a register.

40. The processor of claim 36, further comprising processing means for marking the shifted cache line as having been modified.

41. The processor of claim 36, further comprising a means for performing a snoop cycle.

42. The processor of claim 36, wherein the cache memory comprises a Level 1 cache.

43. The processor of claim 36, wherein the means for reading, the means for shifting and the write circuitry are coupled to operate in a pipeline configuration.

44. The processor of claim 43, wherein the cache lines are moved at a rate of one cache line per processor cycle.

45. A method for moving a data string within a cache memory system, the method comprising:
reading a cache line from a data cache, the cache line containing at least a first portion of a data string and having a starting source address;
shifting the cache line a selected amount;
storing the shifted cache line in a first destination cache line in the data cache, the shifted cache line having a starting destination address;
modifying a cache tag value associated with the first destination cache line to reflect a location of the data string in a main memory;
storing in a register data shifted out of the cache line during the shift operation;
reading from the data cache a second cache line containing at least a second portion of the data string;
shifting the second cache line said selected amount;
filling the shifted second cache line with the data stored in the register during said shifting; and
storing the shifted second cache line in a second destination cache line in the data cache.

46. The method of claim 45, wherein the register has a full storage capacity that is less than the size of the cache line.

* * * * *

UNITED STATES PATENT AND TRADEMARK OFFICE
CERTIFICATE OF CORRECTION

PATENT NO. : 7,120,744 B2 Page 1 of 1
APPLICATION NO. : 10/724472
DATED : October 10, 2006
INVENTOR(S) : Dean A. Klein It is certified that error appears in the above-identified patent and that said Letters Patent is hereby corrected as shown below:

Col. 1, line 12, after "Dec." delete "2." And insert -- 2, --, therefor.

Col. 14, line 64, in Claim 1, after "shifted" insert -- second --.

Signed and Sealed this

Third Day of April, 2007

JON W. DUDAS
*Director of the United States Patent and Trademark Office*